US011741320B2

United States Patent
Arthanari et al.

(10) Patent No.: US 11,741,320 B2
(45) Date of Patent: Aug. 29, 2023

(54) SYSTEMS AND METHODS FOR MITIGATION OF WIRELESS TAG CROSS READS

(71) Applicant: ZEBRA TECHNOLOGIES CORPORATION, Lincolnshire, IL (US)

(72) Inventors: Ramesh Kumar Arthanari, Namakkl (IN); Suresh Ramamoorthy, Ramamoorthy (IN); Sajan Wilfred, Kollam (IN); Neeraj Seshadri, Bangalore (IN); Jagadeesh Balakrishnan, Bangalore (IN); Mukunda Gudi, Bangalore (IN)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 17/525,355

(22) Filed: Nov. 12, 2021

(65) Prior Publication Data
US 2023/0153552 A1 May 18, 2023

(51) Int. Cl.
*G06K 7/10* (2006.01)
(52) U.S. Cl.
CPC .................. *G06K 7/10019* (2013.01)
(58) Field of Classification Search
CPC .................................................. G06K 7/10019
See application file for complete search history.

(56) References Cited

U.S. PATENT DOCUMENTS

| | | | | |
|---|---|---|---|---|
| 6,219,613 B1* | 4/2001 | Terrier | ..................... | G01S 13/74 342/51 |
| 8,331,621 B1* | 12/2012 | Allen | ..................... | G08G 1/015 348/148 |
| 9,911,245 B1* | 3/2018 | Geist | ..................... | G07B 15/063 |
| 2003/0001755 A1* | 1/2003 | Tiernay | ............... | G07B 15/063 705/13 |
| 2003/0109223 A1* | 6/2003 | Toyama | ............... | G07B 15/063 455/39 |
| 2004/0227616 A1* | 11/2004 | Lafferty | ............... | G07B 15/063 340/928 |
| 2006/0054680 A1* | 3/2006 | Feldman | ............. | G07B 15/063 235/375 |
| 2007/0008184 A1* | 1/2007 | Ho | ......................... | G08G 1/015 340/941 |
| 2009/0184847 A1* | 7/2009 | Kohli | ..................... | G08G 1/017 340/989 |

(Continued)

*Primary Examiner* — Tuyen K Vo

(57) ABSTRACT

A method for cross read mitigation in a monitoring station for vehicles carrying respective wireless tags having tag identifiers includes: receiving, from a first tag sensor disposed to detect wireless tag signals in a first lane of the monitoring station, a first tag read containing a tag identifier; receiving, from a second tag sensor disposed to detect further wireless tag signals in a second lane, adjacent to the first lane, of the monitoring station, a second tag read containing the tag identifier; in response to receiving the first and second tag reads, providing an updated tag detection parameter to each of the first and second tag sensors; receiving, from one of the first and second tag sensors, a third tag read containing the tag identifier; and in response to receiving the third tag read, instructing the one of the first and second tag sensors to report the tag identifier to a monitoring server.

17 Claims, 5 Drawing Sheets

(56) References Cited

U.S. PATENT DOCUMENTS

| | | | | |
|---|---|---|---|---|
| 2009/0231161 A1* | 9/2009 | Malarky | .............. | G08G 1/0175 |
| | | | | 340/10.41 |
| 2011/0304441 A1* | 12/2011 | Roesner | .............. | G07B 15/063 |
| | | | | 340/10.4 |
| 2017/0127230 A1* | 5/2017 | Enriquez | ................. | H04W 4/44 |
| 2017/0372161 A1* | 12/2017 | Almeida | .............. | G06V 10/811 |
| 2019/0012657 A1* | 1/2019 | Geist | ...................... | G07B 15/00 |
| 2020/0043248 A1* | 2/2020 | Satyanarayana | ........ | H04W 4/44 |

* cited by examiner

SYSTEMS AND METHODS FOR MITIGATION OF WIRELESS TAG CROSS READS

BACKGROUND

Wireless tags, such as radio frequency identification (RFID) tags, can be affixed to various objects and employed to monitor such objects. For example, vehicle tolling stations can employ sets of sensors such as RFID readers to detect RFID tags affixed to vehicles, in order to control barriers and/or debit accounts associated with the vehicles. In such systems, however, more than one sensor may detect a given tag, which may result in erroneous monitoring data and/or barrier control actions.

SUMMARY

In an embodiment, the present invention is a system for cross read mitigation in a monitoring station for vehicles carrying respective wireless tags having tag identifiers, the system comprising: a validation controller; a first tag sensor disposed to detect wireless tag signals in a first lane of the monitoring station, and configured to provide tag identifiers extracted from the detected wireless tag signals to the validation controller; a second tag sensor disposed to detect further wireless tag signals in a second lane, adjacent to the first lane, of the monitoring station, the second tag sensor configured to provide further tag identifiers extracted from the further detected wireless tag signals to the validation controller; the validation controller configured to: receive, from the first tag sensor, a first tag read containing a tag identifier; receive, from the second tag sensor, a second tag read containing the tag identifier; in response to receiving the first and second tag reads, providing an updated tag detection parameter to each of the first and second tag sensors; receive, from one of the first and second tag sensors, a third tag read containing the tag identifier; and in response to receiving the third tag read, instruct the one of the first and second tag sensors to report the tag identifier to a monitoring server.

In another embodiment, the present invention is a method for cross read mitigation in a monitoring station for vehicles carrying respective wireless tags having tag identifiers, the method comprising: receiving, from a first tag sensor disposed to detect wireless tag signals in a first lane of the monitoring station, a first tag read containing a tag identifier; receiving, from a second tag sensor disposed to detect further wireless tag signals in a second lane, adjacent to the first lane, of the monitoring station, a second tag read containing the tag identifier; in response to receiving the first and second tag reads, providing an updated tag detection parameter to each of the first and second tag sensors; receiving, from one of the first and second tag sensors, a third tag read containing the tag identifier; and in response to receiving the third tag read, instructing the one of the first and second tag sensors to report the tag identifier to a monitoring server.

In a further embodiment, the present invention is a non-transitory computer readable medium storing instructions executable by a processor of a computing device to: receive, from a first tag sensor disposed to detect wireless tag signals in a first lane of a monitoring station for vehicles carrying respective wireless tags having tag identifiers, a first tag read containing a tag identifier; receive, from a second tag sensor disposed to detect further wireless tag signals in a second lane, adjacent to the first lane, of the monitoring station, a second tag read containing the tag identifier; in response to receiving the first and second tag reads, provide an updated tag detection parameter to each of the first and second tag sensors; receive, from one of the first and second tag sensors, a third tag read containing the tag identifier; and in response to receiving the third tag read, instruct the one of the first and second tag sensors to report the tag identifier to a monitoring server.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
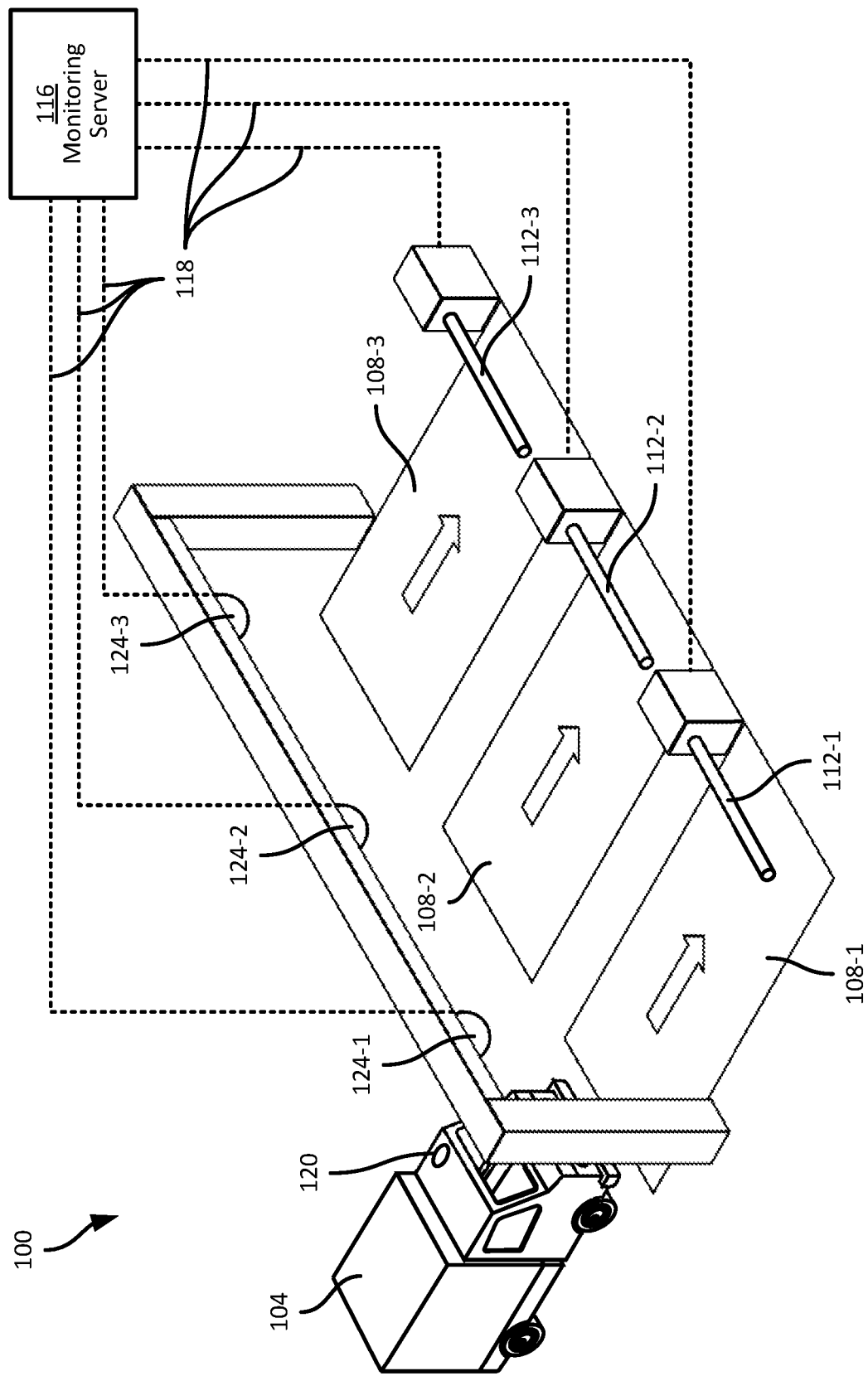
FIG. 1 is a diagram of a system for mitigating wireless tag cross reads.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

FIG. 1 illustrates a system 100 for mitigation of wireless tag cross reads. The system 100 is described in connection with cross read mitigation in a vehicle tolling station, in which vehicles 104 travel along lanes 108-1, 108-2, 108-3 of the tolling station (referred to collectively as lanes 108, and generically as a lane 108; similar nomenclature is also used elsewhere herein). Each lane 108 can include a corresponding barrier 112-1, 112-2, 112-3. Each barrier 112 is controllable to move between a closed position (as illustrated in FIG. 1), preventing a vehicle 104 from proceeding along the corresponding lane 108 to exit the tolling station, and an open position (e.g., raised relative to the closed position) allowing the vehicle 104 to exit the tolling station. As will be apparent, the tolling station can include two lanes 108 and corresponding barriers 112 in other examples, or more than three lanes 108 and barriers 112 in further examples.

It will be apparent in the discussion below that the system 100 can also be deployed in other contexts, e.g., in which the movement of objects other than vehicles 104 along conduits other than the lanes 108 is monitored and cross reads associated with such monitoring are mitigated. For example, the movement of objects such as packages may be monitored along conduits such as conveyor belts, or the like. The monitoring of objects such as the vehicles 104, packages, or the like, need not include account debiting or barrier control, in other examples.

Control of the barriers 112 can be implemented by a computing device such as a monitoring server 116, e.g., communicatively coupled to the barriers 112 via a network. The network can be a local- or wide-area network or combinations thereof. In the present example, it is assumed that the server 116 is coupled with the barriers 112 via a local, wired a network 118 such as an Ethernet-based network (e.g., including one or more switches or routers interconnecting the server 116 and the barriers 112).

To determine when to raise a barrier 112 to permit a vehicle 104 in the corresponding lane 108 to exit the tolling station, the server 116 can be configured to obtain an identifier associated with the vehicle 104, and use that identifier to debit an account associated with the identifier, log the passage of a vehicle 104 associated with the identifier, or the like. For example, the server 116 can be configured to debit a financial account associated with the identifier by an amount determined according to a type of the vehicle, the time of day, or the like.

Thus, the vehicle 104, and any other vehicle traversing the tolling station, is associated with an identifier that distinguishes that vehicle 104 from other vehicles 104. For example, the identifier can be a string of characters of suitable length to uniquely identify the particular vehicle. The length and complexity of the identifier can be selected based on a number of vehicles 104 to be uniquely identified. For example, a 96-bit string may be used as the identifier.

Each vehicle 104 carries a wireless tag 120, such as an RFID tag (e.g., a passive RFID tag, although in other examples powered tags may also be employed), storing an identifier associated with vehicle 104 in a memory of the wireless tag 120. The identifier can be a unique identifier of the wireless tag 120 itself, for example, which may be employed by the server 116 to retrieve a vehicle identifier or other vehicle information, account identifier, or the like. The tag can be affixed to the vehicle 104, e.g. on the windshield or the like. The server 116 therefore obtains the identifier associated with a given vehicle via certain components of the system 100 configured to detect wireless tags 120 and capture vehicle identifiers therefrom.

In particular, the system 100 includes a set of tag sensors 124-1, 124-2, 124-3, such as RFID readers (when the tag 120 is an RFID tag). The system 100 includes a sensor 124 for each lane 108, e.g., supported overhead by a suitable supporting structure of the tolling station. Thus, while the system 100 includes three sensors 124 as shown in FIG. 1, in other examples the system 100 can include two sensors 124, while in further examples the system 100 can include more than three sensors 124.

The sensors 124 can also be supported alongside each lane 108, or in any other suitable arrangement to allow each sensor 124 to detect tags 120 within the corresponding lane 108. As will be apparent to those skilled in the art, each sensor 124 can periodically perform a scanning operation, e.g., in which the sensor 124 emits an interrogation signal. The scanning operation can be performed at a wide variety of suitable frequencies. In the present example, the scanning operation may be performed, for example, once every two seconds, although scanning operations can be performed more or less frequently in other examples.

The interrogation signal energizes any tags 120 within range, causing such tags 120 to emit a return signal (also referred to as backscatter, for passive RFID tags). The return signal contains at least the above-mentioned tag identifier of the corresponding tag 120, which can be stored in a non-volatile memory element of the tag 120. The sensor 124 can extract tag identifiers from return signals, and employ the extracted tag identifiers as unique identifiers for vehicles 104. The process of detecting a return signal from a tag 120, and extracting the tag identifier therefrom, may also be referred to as detecting the tag 120 and/or capturing the tag identifier. After capturing one or more tag identifiers, a sensor 124 can send the captured tag identifiers to the server 116, e.g., via the above-mentioned local area network, for processing to debit a corresponding account and/or control a corresponding barrier 112.

In some cases, however, a given sensor 124 may capture a tag identifier from a tag 120 affixed to a vehicle 104 in an adjacent lane 108. For example, as the vehicle 104 shown in FIG. 1 travels along the lane 108-1 toward the barrier 112-1, both the sensor 124-1 and the sensor 124-2 may capture a tag identifier from the tag 120. That is, although each sensor 124 is physically arranged to detect tags 120 in a particular lane 108, the sensors 124 may operate according to tag detection parameters (e.g., transmit power for the above-mentioned interrogation signal) that also enable a sensor 124 to detect tags 120 in adjacent lanes 108. Tag detection parameters such as transmit power may be selected, for example, to reduce the likelihood that a given sensor 124 fails to detect a tag 120 in a lane 108 over which that sensor 124 is installed. That transmit power, however, may also be sufficiently high to lead to the undesired detection of tags 120 in adjacent lanes 108.

In the scenario illustrated in FIG. 1, the sensor 124-2 may capture the tag identifier of the tag 120 as the vehicle 104 proceeds along the lane 108-1, referred to as a cross read of the tag 120. When the sensor 124-2 reports the tag identifier to the server 116, the server 116 may debit an account associated with the tag 120 and raise the barrier 112-2. Another vehicle, in the lane 108-2, may therefore be allowed passage without payment. Further, the account associated with the tag 120 may be debited again when the sensor 124-1 detects the tag 120 and reports the same tag identifier to the server 116 (leading to raising of the correct barrier 112-1 to allow passage to the vehicle 104).

To detect cross read situations such as that set out above, and reduce the likelihood of the same tag 120 being detected and reported to the server 116 by multiple sensors 124 during a single passage of the corresponding vehicle 104, the system 100 implements functionality to detect and eliminate cross reads before tag identifiers are reported to the server 116. As a result, the risk of inaccurate control actions by the server, resulting from cross read, may be reduced.

In particular, as will be discussed in detail below, the system 100 includes one or more validation controllers, which may be implemented within the sensors 124 themselves. The validation controller(s) collect tag identifiers and determine whether a cross read has occurred. When a cross read is detected, the validation controller(s) can provide updated tag detection parameters (e.g., transmit power, as noted earlier) to the sensors 124 involved in the cross read. The involved sensors 124 may then perform another scanning operation, using the updated tag detection parameters, which may reduce the likelihood of each sensor 124 detecting tags 120 outside its own lane 108. A tag identifier may then be reported to the server 116 only when a single detection of the tag identifier is made. That is, reporting of the tag identifier to the server 116 may be effected only when a single sensor 124 detects a return signal containing the tag identifier.

Figure 2:
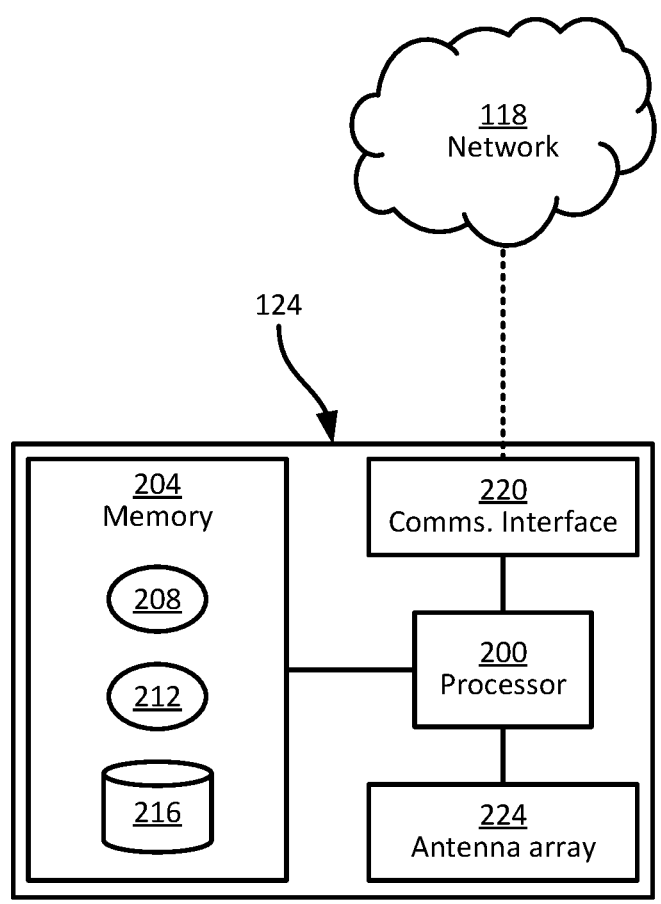
FIG. 2 is a diagram of certain internal components of a tag sensor in the system of FIG. 1.

Turning to FIG. 2, certain internal components of an example tag sensor 124 are depicted. Each of the sensors 124 in the system 100 includes the components shown in FIG. 2, unless noted otherwise below. The sensor 124 includes a processor 200, such as a central processing unit (CPU) or other suitable integrated circuit component, interconnected with a non-transitory computer-readable medium such as a memory 204. The memory 204 can include a suitable combination of volatile and non-volatile memory, implemented as one or more integrated circuits (either distinct or integrated with the processor 200).

The memory 204 stores computer-readable instructions executable by the processor 200, in the form of one or more applications. Via execution of such instructions, the processor 200 is configured to perform various functions, as discussed below. Thus, when the processor 200 or the sensor 124 are referred to as being configured to perform various actions, it will be understood that they are so configured via the execution of such applications by the processor 200.

In the illustrated example, the memory 204 stores a tag reading application 208, and a validation application 212. Execution of the tag reading application 208 configures the sensor 124 to perform the above-mentioned scanning operations, to detect tags 120, capture tag identifiers therefrom, and provide the tag identifiers to other elements in the system 100 and/or to the server 116. Execution of the validation application 212 configures the sensor 124 to collect tag identifiers captured by the sensor 124 itself and from other sensors 124, and to process such tag identifiers to detect and mitigate cross read before tag identifiers are reported to the server 116. In some examples, each sensor 124 includes a validation application 212, e.g., to enable the additional computation associated with cross read detection to be balanced across the sensors 124. In other examples, only a subset (e.g., fewer than all the sensors 124, and as few as one sensor 124) of the sensors 124 may include the validation application 212. In further examples, the functionality implemented by the validation application 212 can be performed by a separate computing device, distinct from the sensors 124 and the server 116. Any device executing the validation application (including the sensors 124) may also be referred to as a validation controller.

The memory 204 can also store a repository 216 containing values employed during the execution of either or both of the applications 208 and 212. For example, the repository 216 can contain the above-mentioned tag detection parameters. In some examples, in which the system 100 contains more than one validation controller (e.g., in which each sensor 124 implements a validation controller) the repository 216 can also contain data employed in the selection of a validation controller to which to send a captured tag identifier.

The sensor 124 further includes a communications interface 220, such as an Ethernet controller, enabling the sensor 124 to communicate over the network 118 with the other sensors 124 as well as the server 116. In other examples, the communications interface 220 can implemented a wireless interface rather than a wired Ethernet interface. The communications interface 220 therefore includes any suitable hardware and firmware elements (e.g., cable ports, antenna elements, transceivers and the like) enabling the sensor 124 to connect to the network 118, selected according to the nature of the network 118.

The sensor 124 also includes at least one antenna or an antenna array 224, controllable by the processor 200 (via execution of the application 208) to emit the above-mentioned interrogation signals and detect backscatter signals from the tags 120. The antenna array 224 can include a wide variety of suitable arrangements of radiative elements, as will be apparent to those skilled in the art.

Figure 3:
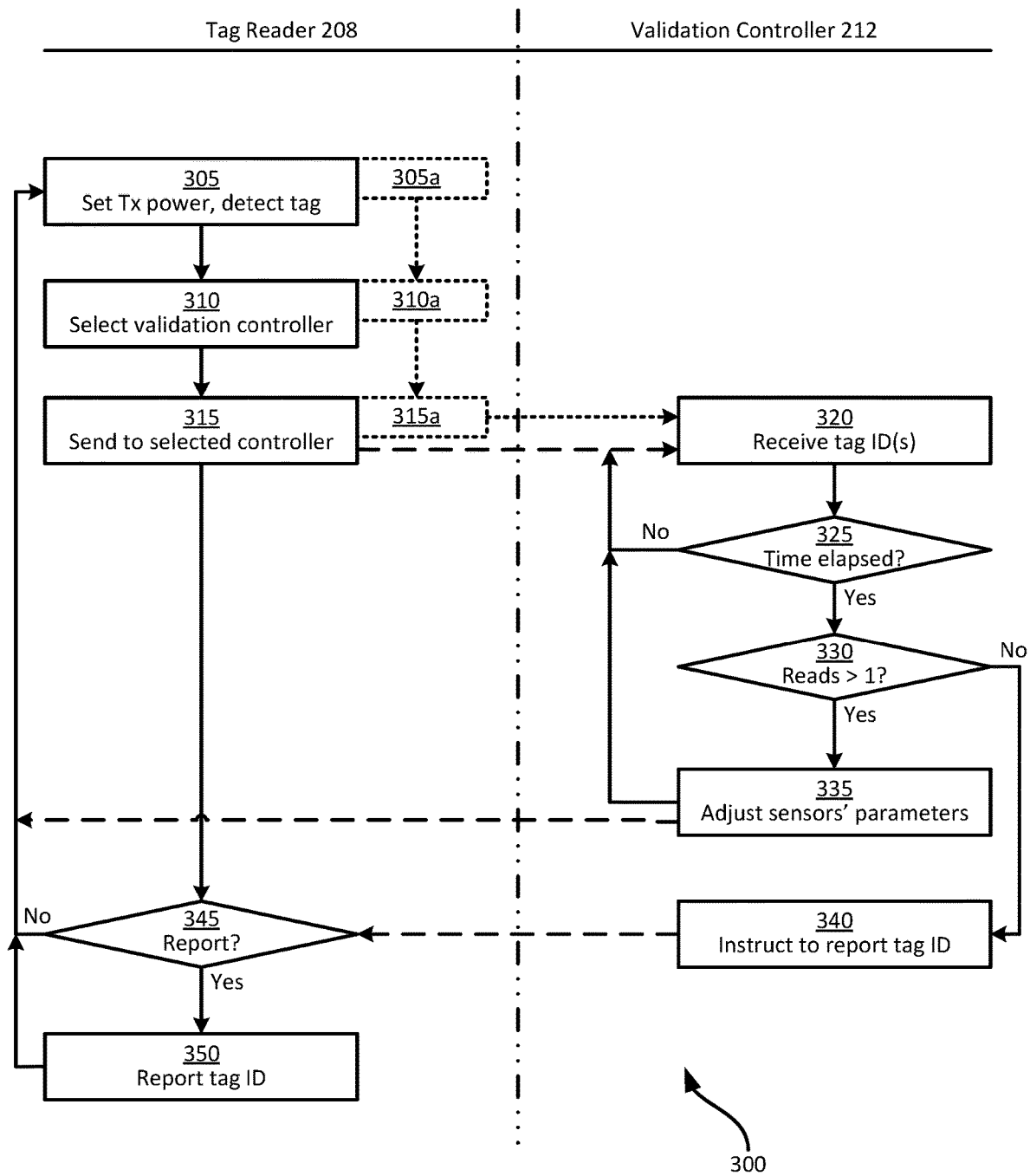
FIG. 3 is a flowchart of a method for mitigating wireless tag cross reads.

Turning to FIG. 3, a method 300 of mitigating wireless tag cross read is illustrated. The method 300 is described below in conjunction with its example performance in the system 100, although it will be apparent that the method 300 can also be implemented in other suitable systems. As shown in FIG. 3, certain blocks of the method 300 are performed via the execution of tag reading applications 208 at the sensors 124. Those blocks appear under the heading "tag reader 208". Other blocks of the method 300 are performed via the execution of validation applications 212, either at the sensors 124 or distinct computing device(s). Those blocks appear under the heading "validation controller 212". It will also be understood in the discussion below that each sensor 124 can perform the method 300, e.g., in parallel with performances of the method 300 by other sensors 124.

At block 305, a given sensor 124 is configured to control the corresponding antenna array 224 according to the tag detection parameters mentioned above (e.g., a transmission power) to detect a tag 120, e.g., via the generation of one or more interrogation signals and detection of a return signal resulting from reflection of the interrogation signal at the tag 120. As will be apparent to those skilled in the art, the sensor 124 may detect more than one return signal (indicating the detection of more than one tag 120) in response to a given transmitted interrogation signal. The sensor 124, in such situations, is configured to perform distinct instances of the method 300 for each captured tag identifier. As such, the discussion below focusses on the processing of a single captured tag identifier.

The detection of a tag 120 at block 305 includes at least capturing the tag identifier of that tag 120. The sensor 124 can also determine additional data associated with the return signal received from the tag. For example, the sensor 124 can generate a proximity indicator, indicative of a distance between the sensor 124 and the detected tag 120. The proximity indicator can be a received signal strength indicator (RSSI) or other signal strength measurement, although it will be understood that such measurements are imperfect representations of distance, given that they may be affected by signal reflections in the environment, and the like. The sensor 124 can also associate a timestamp with the captured tag identifier at block 305, indicating the date and time at which the tag identifier was captured. The information captured at block 305 may also include other values emitted by the tag 120, such as a type of the vehicle 104 or the like. In some examples, data such as a vehicle type are not captured at block 305, but are instead stored, e.g., at the server 116, and therefore later retrieved based on the tag identifier.

At block 310, rather than proceeding directly to reporting the tag identifier to the server 116, the sensor 124 is configured to select a validation controller, and provide the captured tag identifier to the selected validation controller. More specifically, the tag reading application 208 at the sensor 124 is configured to select a validation application 212 (whether that validation application 212 is local to the sensor 124 or not), and provide the tag identifier to the selected validation application 212 at block 315.

In some examples, selection of a validation controller at block 310 can be implemented according to the number of available validation controllers in the system 100, and the computational resources of the available validation controllers. In some examples, the system 100 may include only one validation controller, in which case the sensor 124 (or more specifically, the tag reading application 208) may simply select that validation controller.

In the present example, it is assumed that each sensor 124 in the system 100 implements a validation controller, e.g. via execution of a corresponding validation application 212 in parallel with the tag reading application 208. At block 310, therefore, the sensor 124 is configured to determine which sensor 124 to send the tag identifier to, for processing of the tag identifier by the validation application 212 of that sensor 124. Each sensor 124 may, for example, be assigned a predefined range of tag identifiers, as will be discussed below, and the sensor 124 that captured the tag identifier at block 305 may therefore select the relevant sensor 124 for processing based on those predefined ranges.

As noted above, the sensors 124 operate concurrently with one another, and therefore the sensors 124 in the system 100 can each perform one or more instances of the method 300 in parallel with one another. As a result, as also noted above, a single tag 120 may sometimes be read by more than one sensor 124. FIG. 3 illustrates, for example, blocks 305a, 310a, and 315a, assumed to take place in parallel with the performances of blocks 305, 310, and 315, at another sensor 124. That is, blocks 305a, 310a, and 315a are functionally equivalent to blocks 305, 310, and 315, but are performed by a different sensor 124, and about the same time as blocks 305, 310, and 315.

Figure 4:
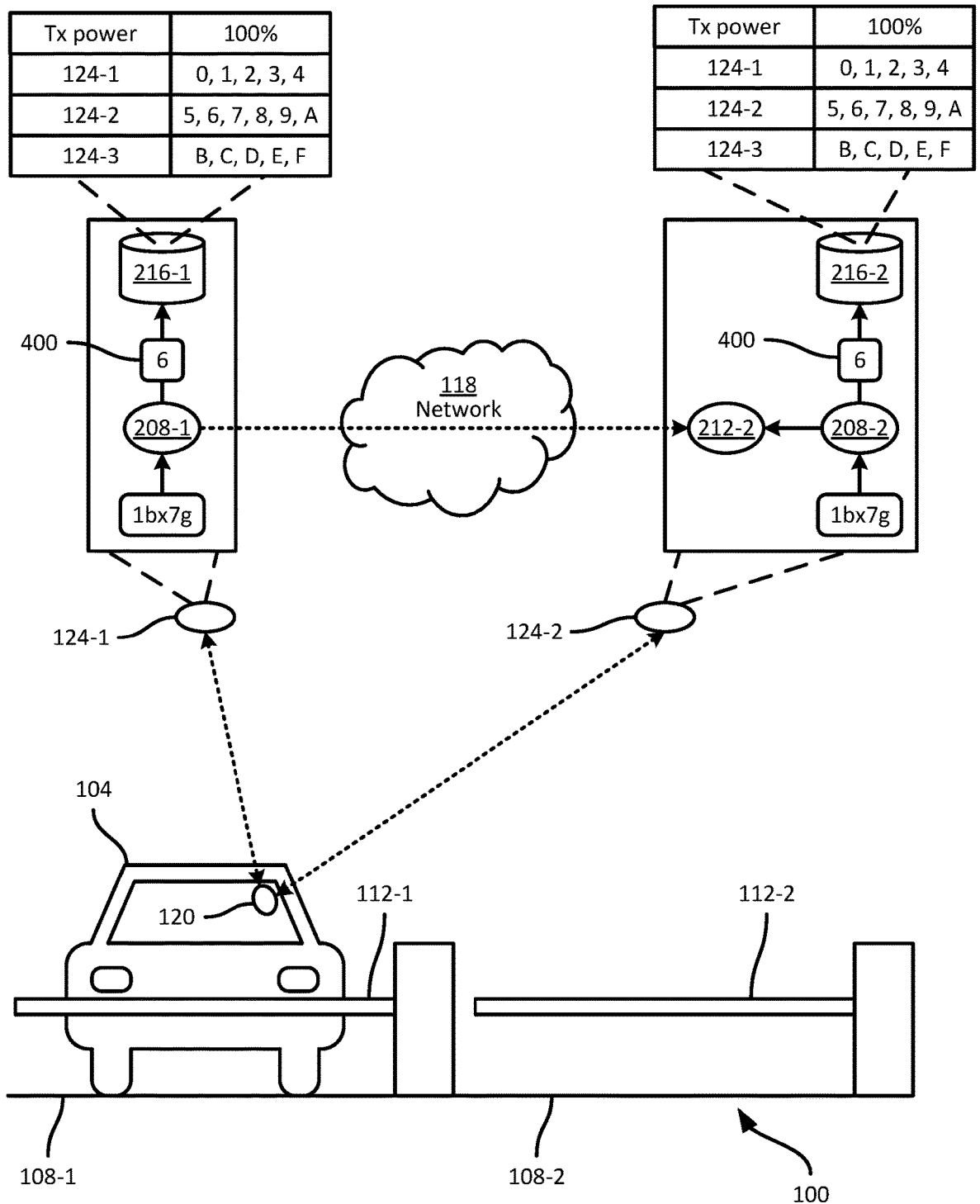
FIG. 4 is a diagram illustrating an example performance of blocks 305, 310, and 315 of the method of FIG. 3.

Turning to FIG. 4, an example performance of blocks 305, 310, and 315 is illustrated, along with an example performance of blocks 305a, 310a, and 315a (i.e., blocks 305, 310, and 315 as performed by an additional sensor 124). In particular, FIG. 4 illustrates a front view of a portion of the system 100, including the lanes 108-1 and 108-2, as well as the barriers 112-1 and 112-2 and the sensors 124-1 and 124-2. The vehicle 104, bearing the tag 120, travels along the lane 108-1 toward the barrier 112-1. The sensor 124-1, via a periodic scanning operation at block 305, emits an interrogation signal according to tag detection parameters, such as a transmit power parameter stored in the repository 216-1. The transmit power is shown as 100%, but need not be expressed as a percentage in other examples. The sensor 124-1, as a result of the interrogation signal, detects the tag 120 and captures a tag identifier "1bx7g" from the tag 120.

At about the same time, at block 305a, the sensor 124-2 also performs a periodic scanning operation at block 305a, according to tag detection parameters stored in the repository 216-2 (e.g., in this case a transmit power, which is also set to 100%). The sensor 124-2, as a result, also detects the tag 120 and therefore captures the same tag identifier. As will be apparent, in other words, the tag 120 has been detected by the sensor 124-1 in the lane 108-1 containing the tag 120, but also by the sensor 124-2, outside the lane 108-1. Reporting both reads of the tag 120 to the server 116 may lead to double-charging, incorrect control of the barriers 112, or the like, as mentioned earlier.

At block 310, the sensor 124-1, and in particular the tag reading application 208-1, is configured to select a validation controller. In the illustrated example, each sensor 124 stores a mapping of a range of tag identifiers to sensors 124, e.g., in the repository 216. Thus, the repository 216-1 of the sensor 124-1 contains three records, corresponding to respective sensors 124 (including the sensor 124-1 itself). Each record identifies a range of tag identifiers. In this example, rather than the ranges being defined in terms of tag identifiers themselves, the ranges are defined in terms of a selection value derived from the tag identifiers. For example, to select a validation controller, the tag reader application 208-1 can be configured to generate a hash of the tag identifier.

The same hashing algorithm is employed by every sensor 124, and generates a single-character hexadecimal value, i.e., between zero (0) and fifteen (F). In other words, the selection involves assigning the tag identifier to one of sixteen bins, each bin corresponding to a range of tag identifiers. A wide variety of other mechanisms can be employed to assign the tag identifier to a bin, including for example, modular arithmetic and the like.

As illustrated in FIG. 4, the output of the above-mentioned binning operation (e.g. a hash function or the like) at the sensor 124-1 is the selection value 400, with a value of "6" in this example. Because every sensor 124 employs the same selection value mechanism, the sensor 124-2 also generates the selection value "6" at block 310a. Further, the repository 216-2 contains the same three records as mentioned above in connection with the repository 216-1. The records of the repositories 216 may also contain network identifiers or other identifying information for each sensor 124.

As seen in FIG. 4, the selection value "6" corresponds to the sensor 124-2. Therefore, at block 310 the tag reading application 208-1 selects the validation application 212-2 at the sensor 124-2. Further, at block 310a, the tag reading application 208-2 also selects the validation application 212-2 at the sensor 124-2 (i.e., locally to the tag reading application 208-2). At block 315, therefore, the sensor 124-1 provides the tag identifier to the sensor 124-2 (by transmitting the tag identifier via the network 118) for processing by the validation application 212-2. The sensor 124-1, in other words, sends a message, also referred to as a tag read, to the sensor 124-2, containing at least the tag identifier "1bx7g". At block 315a, meanwhile, the tag reading application 208-2 provides the same tag identifier to the validation application 212-2 for processing.

The selection of validation controllers described above enables every tag read for a given tag identifier to be provided to a single validation controller, giving that validation controller visibility as to whether the same tag 120 has been subject to cross read (i.e., multiple detections from distinct sensors 124). Further, the selection of validation controllers as set out above enables the computational load of validation processes to be distributed across the sensors 124 and/or other validation controller hardware implemented in the system 100.

Returning to FIG. 3, at block 320 the validation controller selected at block 315 (and any parallel performances of block 315 at other sensors 124, such as block 315a) receives at least one instance of the tag identifier from block 305. In the example of FIG. 4, the validation application 212-2 receives two instances of the tag identifier "1bx7g" from the tag 120.

At block 325, the validation application 212-2 is configured to determine whether a predefined time period has expired. For example, the validation application 212-2 can start a timer upon receipt of the first instance of the above tag identifier. The timer can have a predefined length, e.g. of one second (although shorter and longer periods can also be employed). When the determination at block 325 is negative, the validation application 212-2 returns to block 320 to await the receipt of further reads of the same tag (if any), e.g., from other sensors 124. When the determination at block 325 is affirmative, the validation application 212-2 proceeds to block 330. As will now be apparent, the implementation of a time period for receipt of duplicate tag identifiers at blocks 320 and 325 enables the validation controller to collect tag identifiers that are detected close together in time, but not simultaneously. As will also be apparent, detections of the same tag identifier that fall outside the time period of block 325 (e.g. one hour later) may indicate separate traversals of the tolling station by the vehicle, as opposed to duplicate tag detections during a single traversal.

At block 330, the validation controller (i.e., the validation application 212-2, in the present example) is configured to determine, based on the tag identifiers received at block 320, whether cross read has occurred. In particular, the validation controller is configured to determine whether more than one tag read for the tag identifier was received at block 320, within the time period evaluated at block 325. When the determination at block 330 is negative, cross read has not occurred, and the validation controller can instruct the single sensor 124 (more particularly, the single tag reading application 208) that detected the tag 120 to report the tag identifier to the server 116.

When the determination at block 330 is affirmative, however, as in the present example performance of the method 300, the validation controller is configured to proceed to block 335. At block 335, the validation controller is configured to instruct each sensor 124 from which the same tag identifier was received at block 320 to perform another scanning operation, according to adjust tag detection parameters. For example, the further scanning operation can be performed with a lower transmit power. Other adjustments may also be made to the scanning operations, such as narrowing a beam width of the interrogation signal, and the like. In the present example, the validation application 212-2 is configured to instruct the tag reading applications 208-1 and 208-2 to reduce transmit power to 50% (or any of a variety of other reduced transmit powers, relative to the default transmit power shown in FIG. 4). The validation application 212-2 is also configured to store the adjusted tag detection parameters issued at block 335. For example, the adjusted tag detection parameters can be stored in connection with the tag identifier from block 320, and identifiers of the affected sensors 124.

Having received an instruction from the validation controller to reduce transmit power or adjust other tag detection parameters, the relevant sensors 124 are configured to initiate another scanning operation at block 305, as described above.

Figure 5A:
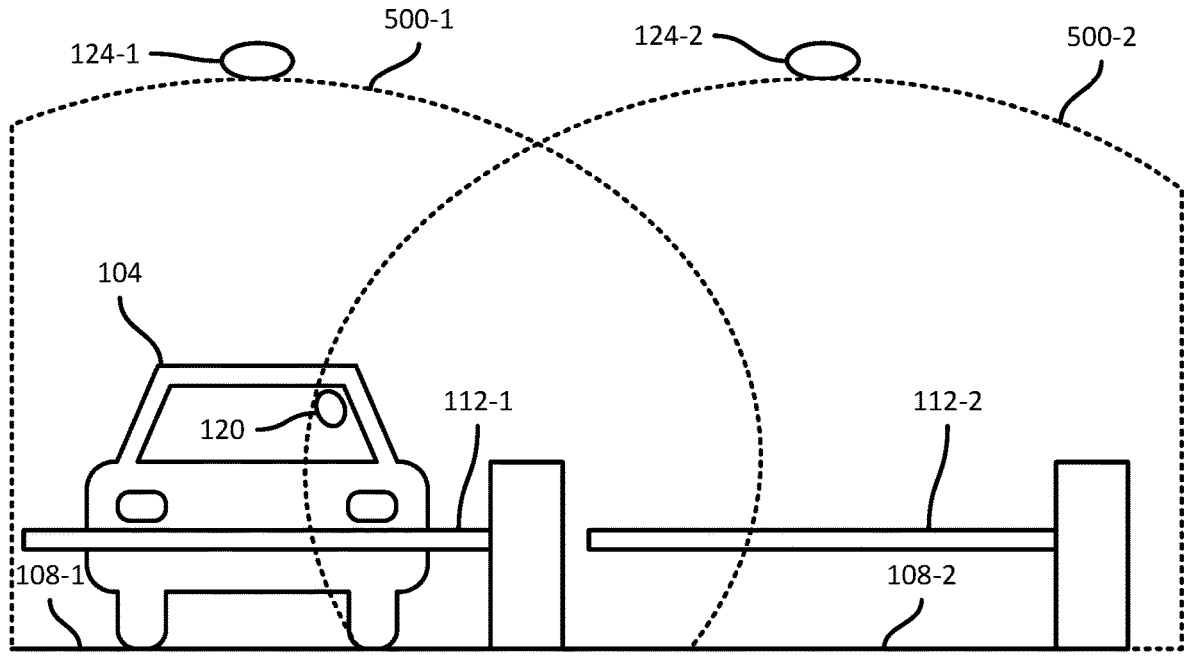
FIG. 5A is a diagram illustrating an example scanning operation at a default transmit power.
Figure 5B:
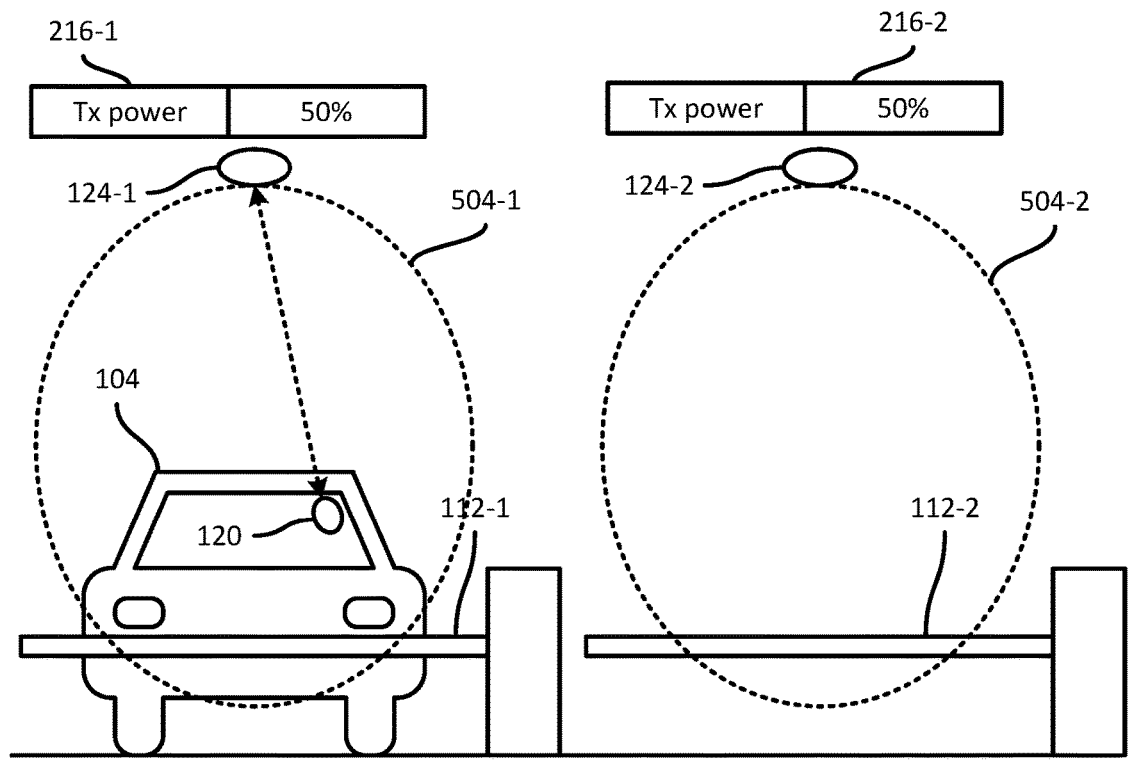
FIG. 5B is a diagram illustrating an example scanning operation at a reduced transmit power.

FIGS. 5A and 5B illustrate an example effect of the instruction sent at block 335 on the subsequent scanning operations at the relevant sensors 124. In particular, FIG. 5A illustrates sensing ranges 500-1 and 500-2 of the sensors 124-1 and 124-2, respectively, using the default tag detection parameters, such as the transmit powers shown in FIG. 4. As illustrated in FIG. 5A, the default tag detection parameters place the tag 120 within detection range by both the sensors 124-1 and 124-2. It will be understood that the ranges 500 are oversimplified for illustrative purposes in FIGS. 5A and 5B. For example, environmental effects such as signal reflections on surfaces may lead to unevenly shaped ranges 500, and/or ranges 500 whose boundaries change over time for the same tag detection parameters. Indeed, such environmental effects may drive the need to use sufficient transmit power at the sensors 124 to result in periodic cross read, in order to decrease the likelihood of missing a tag 120 in a given lane 108 under some environmental conditions.

FIG. 5B shows a subsequent scanning operation performed by the sensors 124-1 and 124-2, following a reduction in transmit power, e.g. to 50% (as shown in partial depictions of the repositories 216-1 and 216-2 in FIG. 5B). As illustrated, the ranges 500-1 and 500-2 of the sensors 124-1 and 124-2 are reduced. Specifically, while the sensor 124-1 still detects the tag 120 because the tag 120 is physically closer to the sensor 124-1 than to the sensor 124-2 (by virtue of being in the same lane 108 as the sensor 124-1), the sensor 124-2 no longer detects the tag 120.

Therefore, at a subsequent performance of block 320, the validation application 212-2 receives only a single read of the tag 120, from the sensor 124-1. As will be apparent, the same tag identifier ("1bx7g" in this example) leads to selection of the same validation controller at block 310 by the sensor 124-1. As a result, the determination at block 330 by the validation application 212-2 is negative, and the validation application 212-2 proceeds to block 340.

At block 340, the validation controller is configured to instruct the sole reporting sensor 124 to report the tag identifier received at block 320. For example, the instruction sent at block 340 can include the tag identifier itself, as well as any other information received at block 320 (e.g., an RSSI value, and any other data stored by the tag 120 and captured by the sensor 124).

The sensor 124, following transmission of a tag identifier to a selected validation controller, determines, at block 345, whether an instruction to report data has been received from the validation controller. The determination at block 345 can be made, for example, at the time of the next scheduled scanning operation. When an adjustment instruction is received at the sensor 124, the determination at block 345 may be bypassed, or may be negative regardless of the predefined scheduled for scanning operations.

When the determination at block 345 is negative, the sensor 124 returns to block 305 as discussed above. When the determination at block 345 is affirmative, the sensor 124 (specifically, the tag reading application 208) proceeds to block 350. At block 350, the sensor 124 transmits the tag identifier and any other data received from the validation controller (e.g. RSSI measurement, timestamp of the tag detection, and the like) to the server 116. The server 116, in turn, may perform functions such as account debiting and barrier control, as mentioned earlier. As will be apparent to those skilled in the art, the performance of the method 300 enables cross read mitigation without modifying the server 116 itself. For example, the server 116 may have associations between sensors 124 and barriers 112 (and therefore lanes 108) that are hard-coded or otherwise inflexible. The server 116, in other words, may be configured to assume that the sensor 124 reporting a tag identifier is in the same lane 108 the tag itself. Through performance of the method 300, the server 116 can continue to operate under such logic, rather than needing to be updated to also accept a lane identifier, e.g. if a validation controller implemented in a different sensor 124 were configured to report tag identifiers directly to the server 116.

At block 350, the sensor 124 can also be configured to revert the tag detection parameters such as transmit power to default settings (e.g. full transmit power, as shown in FIG. 4).

In some examples, a scanning operation initiated at lower transmit power or other adjusted tag detection parameters from block 335 may still yield more than one read of the same tag 120. In such examples, the determination at block 330 is again affirmative, and the validation controller may further adjust the tag detection parameters, e.g., by further reducing transmit power (e.g., to 25% or any other suitable level below the first adjusted level). As noted above, the validation controller stores the adjusted parameters provided to sensors 124 at block 335 for reference in the event of continued cross read. Once a negative determination at block 330 for the same tag identifier is made (i.e., once cross read has been eliminated), the stored tag detection parameters may be discarded. The instruction at block 340 may be accompanied by instructions to each sensor 124 involved in the cross read at block 320 to return to default tag detection parameters.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A system for cross read mitigation in a monitoring station for vehicles carrying respective wireless tags having tag identifiers, the system comprising:
   a validation controller;
   a first tag sensor disposed to detect wireless tag signals in a first lane of the monitoring station, and configured to provide tag identifiers extracted from the detected wireless tag signals to the validation controller;
   a second tag sensor disposed to detect further wireless tag signals in a second lane, adjacent to the first lane, of the monitoring station, the second tag sensor configured to provide further tag identifiers extracted from the further detected wireless tag signals to the validation controller;
   the validation controller configured to:
      receive, from the first tag sensor, a first tag read containing a tag identifier;
      receive, from the second tag sensor, a second tag read containing the tag identifier;
      in response to receiving the first and second tag reads, provide an updated tag detection parameter to each of the first and second tag sensors;
      receive, from one of the first and second tag sensors, a third tag read containing the tag identifier; and
      in response to receiving the third tag read, instruct the one of the first and second tag sensors to report the tag identifier to a monitoring server,
      wherein the updated tag detection parameter includes a reduced transmit power for interrogation signals.

2. The system of claim 1, wherein the tag sensors include radio frequency identification (RFID) readers.

3. The system of claim 1, further comprising:
   a plurality of validation controllers;
   wherein the first tag sensor and the second tag sensor are configured to select a validation controller from the plurality of validation controllers, and to provide the first tag read and the second tag read to the selected validation controller.

4. The system of claim 3, wherein the first tag sensor and the second tag sensor are each configured to select the validation controller based on the tag identifier.

5. The system of claim 4, wherein the first tag sensor and the second tag sensor are each configured, to select the validation controller, to:
   store (i) validation controller identifiers for each of the plurality of validation controllers, and (ii) for each validation controller identifier, an indication of a range of tag identifiers;
   select one of the ranges containing the tag identifier; and
   select the validation controller identifier corresponding to the selected tag identifier range.

6. The system of claim 3, wherein the plurality of validation controllers include:
   a first validation controller implemented by the first tag sensor; and
   a second validation controller implemented by the second tag sensor.

7. The system of claim 1, wherein the validation controller is further configured to determine that the second tag read was received within a predetermined time period of the first tag read.

8. The system of claim 1, wherein the validation controller is further configured, prior to instructing the one of the first and second tag sensors to report the tag identifier, to:
   determine that a predetermined time period has elapsed since receipt of the third tag read, without receipt of a further tag read containing the tag identifier.

9. A method for cross read mitigation in a monitoring station for vehicles carrying respective wireless tags having tag identifiers, the method comprising:
   receiving, from a first tag sensor disposed to detect wireless tag signals in a first lane of the monitoring station, a first tag read containing a tag identifier;
   receiving, from a second tag sensor disposed to detect further wireless tag signals in a second lane, adjacent to the first lane, of the monitoring station, a second tag read containing the tag identifier;
   in response to receiving the first and second tag reads, providing an updated tag detection parameter to each of the first and second tag sensors;
   receiving, from one of the first and second tag sensors, a third tag read containing the tag identifier; and
   in response to receiving the third tag read, instructing the one of the first and second tag sensors to report the tag identifier to a monitoring server,
   wherein the updated tag detection parameter includes a reduced transmit power for interrogation signals.

10. The method of claim 9, wherein the tag sensors include radio frequency identification (RFID) readers.

11. The method of claim 9, further comprising, at each of the first tag sensor and the second tag sensor:
    selecting the validation controller from a plurality of validation controllers; are configured to select a validation controller from the plurality of validation controllers; and
    providing the first tag read and the second tag read to the selected validation controller.

12. The method of claim 11, wherein selecting the validation controller includes selecting the validation controller based on the tag identifier.

13. The method of claim 12, wherein selecting the validation controller includes:
  storing (i) validation controller identifiers for each of the plurality of validation controllers, and (ii) for each validation controller identifier, an indication of a range of tag identifiers;
  selecting one of the ranges containing the tag identifier; and
  selecting the validation controller identifier corresponding to the selected tag identifier range.

14. The method of claim 11, wherein the plurality of validation controllers include:
  a first validation controller implemented by the first tag sensor; and
  a second validation controller implemented by the second tag sensor.

15. The method of claim 9, further comprising:
  determining that the second tag read was received within a predetermined time period of the first tag read.

16. The method of claim 9, further comprising, prior to instructing the one of the first and second tag sensors to report the tag identifier, to:
  determining that a predetermined time period has elapsed since receipt of the third tag read, without receipt of a further tag read containing the tag identifier.

17. A non-transitory computer readable medium storing instructions executable by a processor of a computing device to:
  receive, from a first tag sensor disposed to detect wireless tag signals in a first lane of a monitoring station for vehicles carrying respective wireless tags having tag identifiers, a first tag read containing a tag identifier;
  receive, from a second tag sensor a second tag sensor disposed to detect further wireless tag signals in a second lane, adjacent to the first lane, of the monitoring station, a second tag read containing the tag identifier;
  in response to receiving the first and second tag reads, provide an updated tag detection parameter to each of the first and second tag sensors;
  receive, from one of the first and second tag sensors, a third tag read containing the tag identifier; and
  in response to receiving the third tag read, instruct the one of the first and second tag sensors to report the tag identifier to a monitoring server,
  wherein the updated tag detection parameter includes a reduced transmit power for interrogation signals.

* * * * *